9616X
P Crim,
Riding Saddle.
Patented Apr. 28, 1836
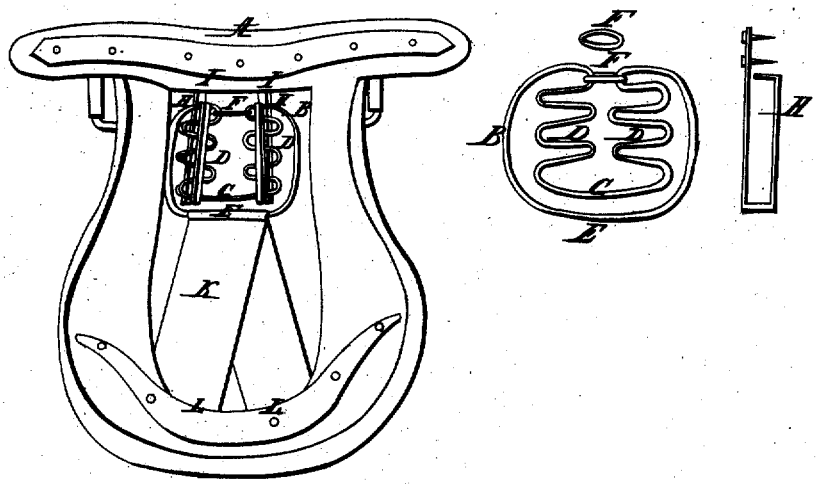
N. PETERS, PHOTO-LITHOGRAPHER, WASHINGTON, D. C.

4/28/1836 9616 X

April 28. 1836

401

Peter Crim of Waynesboro' Pennsylvania

Letters Patent

The Schedule referred to in these Letters Patent and making part of the same containing a description in the words of the said Peter Crim himself of of his improvement in the Double Serpentine Spring Saddle.

Be it known that I Peter Crim, of Waynesboro' in the County of Franklin and State of Pennsylvania, have made a new and useful improvement in Saddles and called "Crim's improved double Serpentine Spring Saddle" which is described as follows. reference being had to the annexed drawing of the same making part of this Specification. The Tree A is constructed in the usual manner. B represents a piece of steel forming the spring bar C. The Serpentine Spring D.D. The Web bar E. its ends being welded together or otherwise secured. F. is a link which connects the two sides of the spring. this Spring is shaped to fit into its proper place under the tree. H. H. represent the Staples bent around the spring and riveted to the tree at I. I. The spring is entirely covered with leather. The webbing K is to be attached to the web bar and carried back to the cantel where it is fastened at L.L.

What I claim as my invention in the above described Saddle and not previously known is the peculiar formation of the double serpentine spring and Staples — These being so constructed as to conform, tend with the formation of the saddle near the head and being attached as before described. and particularly the application of the same to Saddles either in Girths or Girth straps.

Witnesses
Wm. P. Elliot
B. K. Morsell

Peter Crim

Recd.
11960

(280 words)

(Patented 28 April 1836 —)

[illegible]